(12) United States Patent
Zhou et al.

(10) Patent No.: US 8,592,333 B2
(45) Date of Patent: Nov. 26, 2013

(54) GREEN LIGHT-EMITTING GLASS AND METHOD OF PREPARING THE SAME

(75) Inventors: Mingjie Zhou, Shenzhen (CN); Wenbo Ma, Shenzhen (CN); Zhaopu Shi, Shenzhen (CN); Yanbo Qiao, Shenzhen (CN); Qingtao Li, Shenzhen (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 170 days.

(21) Appl. No.: 13/257,314

(22) PCT Filed: Mar. 25, 2009

(86) PCT No.: PCT/CN2009/070995
§ 371 (c)(1),
(2), (4) Date: Sep. 19, 2011

(87) PCT Pub. No.: WO2010/108317
PCT Pub. Date: Sep. 30, 2010

(65) Prior Publication Data
US 2012/0010067 A1    Jan. 12, 2012

(51) Int. Cl.
C03C 3/095  (2006.01)
C03C 4/12   (2006.01)
C03B 25/00  (2006.01)
C09K 11/78  (2006.01)
C09K 11/79  (2006.01)

(52) U.S. Cl.
USPC .......... 501/64; 501/73; 252/301.4 F; 65/32.1; 65/21.1; 250/459.1; 250/458.1

(58) Field of Classification Search
USPC ........ 501/64, 73; 65/21.1, 32.1; 252/301.4 F; 250/459.1, 458.1
See application file for complete search history.

(56) References Cited

U.S. PATENT DOCUMENTS

| 3,523,091 | A |   | 8/1970  | McAllister                    |
|-----------|---|---|---------|-------------------------------|
| 3,654,172 | A | * | 4/1972  | Reade ............... 252/301.4 F |
| 4,629,582 | A | * | 12/1986 | Terashima et al. ... 252/301.4 P |
| 5,120,970 | A | * | 6/1992  | Buchanan et al. ...... 250/483.1 |
| 5,122,671 | A | * | 6/1992  | Buchanan et al. ...... 250/483.1 |
| 5,391,320 | A | * | 2/1995  | Buchanan et al. ..... 252/301.4 F |
| 6,271,160 | B1 | * | 8/2001 | Yamamoto et al. ........... 501/42 |
| 6,372,155 | B1 | * | 4/2002 | Yamazaki et al. ..... 252/301.4 R |

OTHER PUBLICATIONS

International Search Report for PCT Patent Application No. PCT/CN2009/070995.

* cited by examiner

Primary Examiner — Anthony J Green
Assistant Examiner — Elizabeth A Bolden

(57) ABSTRACT

A green light-emitting glass and the method of preparing the same are provided. The components with parts by mole of the green light-emitting glass are alkali oxide 25-40, $Y_2O_3$ 0.01-15, $SiO_2$ 40-70, $Tb_2O_3$ 0.01-15. The method of preparing the glass includes mixing alkali salt with $Y_2O_3$, $SiO_2$ and $Tb_4O_7$, firing the mixture at 1200° C.-1500° C. for 1-5 hours, cooling the precursor to the room temperature and annealing the precursor in a reducing atmosphere at 600° C.-1200° C. for 1-20 hours. A green light-emitting glass with good transparence, high uniformity, easily being made into big bulk and high stability is provided. The process of capsulation of parts by using the glass is simple. And a method of preparing the glass with simple process and low cost is provided.

14 Claims, 1 Drawing Sheet

GREEN LIGHT-EMITTING GLASS AND METHOD OF PREPARING THE SAME

FIELD OF THE INVENTION

The present invention belongs to the technical field of luminescent material manufacturing and relates to a green light-emitting glass and method of preparing the same.

BACKGROUND OF THE INVENTION

Green light-emitting material is widely applied in our daily life. For example, a green light-emitting material $CeMgAl_{11}O_{19}:Tb$ which converts the ultraviolet ray of 254 nm emitted by mercury vapor into a green visible light for emission is used in the fluorescent lamp. ZnS:Cu,Au,Al is utilized in the color picture tube of the television to convert the cathode ray into a green visible light for emission. For the X-ray imaging system widely used in the medical field, the imaging is achieved by the excitation of the X-ray passing through the human body on the green light-emitting material $Gd_2O_2S:Tb$ and used for assisting a doctor in making a diagnosis of a patient's condition. It can be seen from this that it is needed to select different green light-emitting materials in different application fields. However, there is still no kind of green light-emitting material which can possess excellent photoluminescence, cathodoluminescence and X-radioluminescence properties simultaneously up to now.

Furthermore, all these light-emitting materials above are non-transparent powders and consequently have poor transparence. It is required for these powders to be ground and washed before screen coating and to be heat treated necessarily after screen coating. Besides, there is certain requirement on the particle size of the powder. The entire process can cause the luminescent property of the material to be reduced.

SUMMARY OF THE INVENTION

The objective of the present invention is to provide a green light-emitting glass with good transparence, high uniformity, easily being made into big bulk and high stability, aiming at the problems that the green light-emitting material in the prior art has poor transparence and needs to be treated before screen coating, resulting the decline of the luminescent property of such material. The process of capsulation of parts by using the glass is simple.

Another objective of the present invention is to provide a method of preparing the green light-emitting glass with simple process and low cost.

According to an aspect, a green light-emitting glass is provided, components with parts by mole of which are alkali oxide 25-40, $Y_2O_3$ 0.01-15, $SiO_2$ 40-70 and $Tb_2O_3$ 0.01-15.

The components with parts by mole of the green light-emitting glass are preferably alkali oxide 30-38, $Y_2O_3$ 1-10, $SiO_2$ 50-65 and $Tb_2O_3$ 1-10.

The alkali oxide is at least one selected from a group of $Na_2O$, $K_2O$ and $Li_2O$.

According to an aspect, a method of preparing the green light-emitting glass is provided, which includes mixing raw materials of alkali salt, $Y_2O_3$, $SiO_2$ and $Tb_4O_7$, firing the raw materials at 1200° C.-1500° C. for 1-5 hours, cooling a precursor to a room temperature, annealing the precursor in a reducing atmosphere at 600° C.-1200° C. for 1-20 hours and then obtaining the green light-emitting glass.

In the method of preparing the green light-emitting glass, the method includes taking the alkali salt, $Y_2O_3$, $SiO_2$ and $Tb_4O_7$ as the raw materials, mixing the raw materials uniformly and placing the raw materials in a crucible for firing at 1300° C.-1450° C. for 1-5 hours; pouring out produced frit, cooling the produced frit to the room temperature, annealing the produced frit in a gas mixture of nitrogen and hydrogen at 650° C.-900° C. for 2-15 hours and then obtaining the green light-emitting glass, wherein a volume ratio of the nitrogen and hydrogen is 95:5; parts by mole of alkali metal element in the raw materials are 50-80, parts by mole of Y element in the raw materials are 0.02-30, parts by mole of Si element in the raw materials are 40-70, and parts by mole of Tb element in the raw materials are 0.02-30.

In the method of preparing the green light-emitting glass, the parts by mole of alkali metal element in the raw materials are preferably 60-76, parts by mole of Y element in the raw materials are preferably 2-20, parts by mole of Si element in the raw materials are preferably 50-65, and parts by mole of Tb element in the raw materials are preferably 2-20.

Purities of the alkali salt, $Y_2O_3$, $SiO_2$ and $Tb_4O_7$ are no less than that of an analytical reagent. Analytical reagent (AR) is one kind of a standard of purity in the chemistry field, which is suitable for proximate analysis and chemistry experiment and referring to characteristics of high content of principle component, higher purity and low content of interference impurities. However, the purity of analytical reagent is varied for different raw materials.

The alkali salt is at least one selected from a group of sodium salt, potassium salt and lithium salt.

The alkali salt is at least one selected from a group of sodium carbonate, potassium carbonate and lithium carbonate.

The obvious advantages of the green light-emitting glass in the present invention are its excellent transparence, high uniformity, easily being made into big bulk and high stability. Besides, the progress of device packaging by using the green light-emitting glass is very simple. Therefore, the green light-emitting glass capable of achieving a high-efficiency light-emission is quite suitable for being applied to the light-emitting dielectric material in the fields of lighting and display.

The method of preparing the green light-emitting glass has simple process and low cost, and solves the problems that due to the limitations of preparation condition and structure of glass, the luminous intensity of many light-emitting active ions is low in glass, or even the light-emitting active ions fail of light-emission.

BRIEF DESCRIPTION OF THE DRAWINGS

The present invention will be further described with reference to the accompanying drawings and embodiments in the following. In the Figures.

The photoluminescence spectrum is measured by SHIMADZU RF-5301PC fluorescence spectrophotometer.

The test condition for the cathodoluminescence spectrum is as follows: the acceleration voltage of electron beam excitation is 7.5 kV.

DETAILED DESCRIPTION OF THE PREFERRED EMBODIMENT

Example 1

Figure 1:
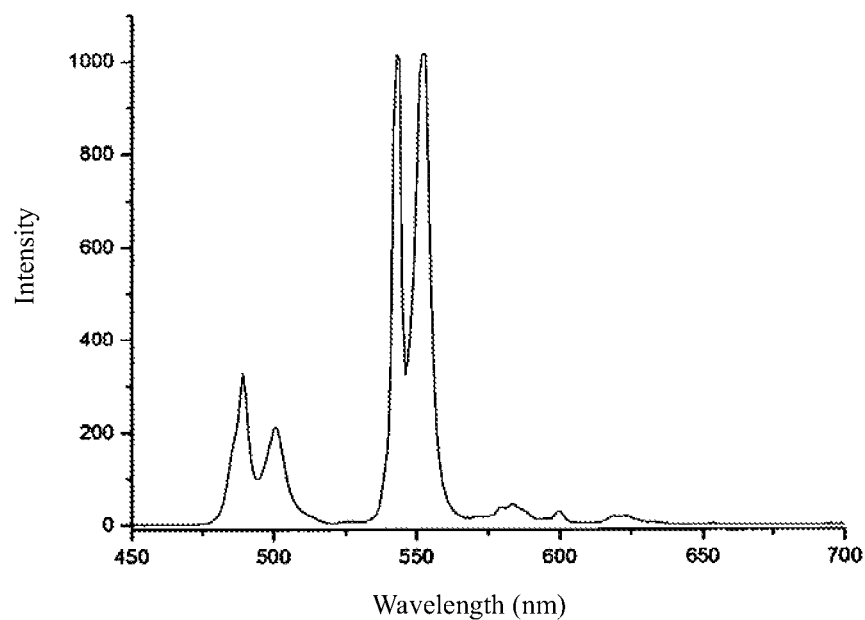
FIG. 1 is the photoluminescence spectrum of the green light-emitting glass prepared in the example 1 excited by an ultraviolet light at 378 nm.
Figure 2:
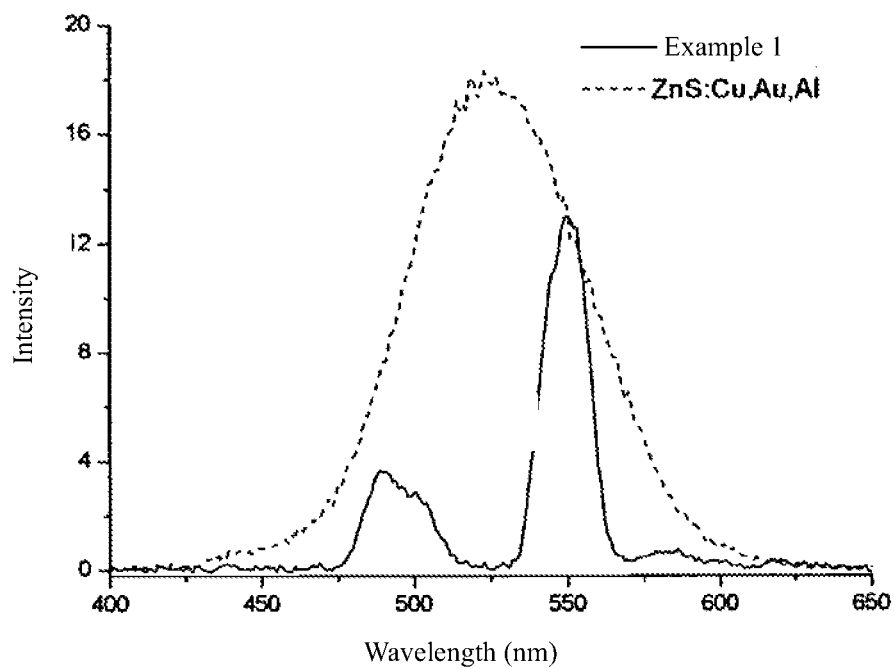
FIG. 2 is the cathodoluminescence spectrums of the green light-emitting glass prepared in the example 1 and a commercial fluorescent powder ZnS:Cu,Au,Al.

Analytically pure $Na_2CO_3$, analytically pure $SiO_2$ as well as $Y_2O_3$ of 99.99% and $Tb_4O_7$ of 99.99% are taken as main raw materials. 9.59 g $Na_2CO_3$, 4.08 g $Y_2O_3$, 10.88 g $SiO_2$ and 4.51 g $Tb_4O_7$ are mixed together and the obtained mixture is fired at 1350° C. for 2 hours. Then the frit is poured out, cooled to the room temperature and further annealed in a reducing atmosphere at 900° C. for 4 hours, wherein the volume ration of nitrogen and hydrogen in the reducing atmosphere is 95:5. After that, the green light-emitting glass $30Na_2O.6Y_2O_3.60SiO_2.4Tb_2O_3$ (among it, the coefficient in front of each component means its part by mole, which is similar hereafter) is obtained. As shown in FIG. 1, it is the photoluminescence spectrum of the green light-emitting glass prepared in the example excited by an ultraviolet light at 378 nm. The figure shows that its main light-emitting peak is in the range of 520-570 nm, i.e. the light-emission wavelength range of green light and the green emission is strong. In addition, as shown in FIG. 2, it is the cathodoluminescence spectrums of the green light-emitting glass prepared in the example and the commercial fluorescent powder ZnS:Cu,Au, Al in the prior art when they are excited by the electron beam at an acceleration voltage of 7.5 kV. The figure shows that the green light-emitting glass prepared in the example and the commercial fluorescent powder have considerable luminous intensity while the color purity of the glass in the present invention is better than that of the commercial fluorescent powder. The light-emitting glass prepared in the example is no longer limited by the preparation condition and structure of the glass in the prior art and makes the luminous intensity of light-emitting active ion strong in the glass.

Example 2

Analytically pure $K_2CO_3$, analytically pure $SiO_2$ as well as $Y_2O_3$ of 99.99% and $Tb_4O_7$ of 99.99% are taken as main raw materials. 11.2 g $K_2CO_3$, 3.66 g $Y_2O_3$, 9.74 g $SiO_2$ and 4.04 g $Tb_4O_7$ are mixed together and the obtained mixture is fired at 1450° C. for 2 hours. Then the fit is poured out, cooled to the room temperature and further annealed in a reducing atmosphere at 1000° C. for 2 hours, wherein the volume ration of nitrogen and hydrogen in the reducing atmosphere is 95:5. After that, the green light-emitting glass $30K_2O.6Y_2O_3.60SiO_2.4Tb_2O_3$ is obtained.

Example 3

Analytically pure $Li_2CO_3$, analytically pure $SiO_2$ as well as $Y_2O_3$ of 99.99% and $Tb_4O_7$ of 99.99% are taken as main raw materials. 7.56 g $Li_2CO_3$, 4.62 g $Y_2O_3$, 12.31 g $SiO_2$ and 5.1 g $Tb_4O_7$ are mixed together and the obtained mixture is fired at 1300° C. for 2 hours. Then the frit is poured out, cooled to the room temperature and further annealed in reducing atmosphere at 600° C. for 20 hours, wherein the volume ration of nitrogen and hydrogen in the reducing atmosphere is 95:5. After that, the green light-emitting glass $30Li_2O.6Y_2O_3.60SiO_2.4Tb_2O_3$ is obtained.

Example 4

Analytically pure $Na_2CO_3$, analytically pure $SiO_2$ as well as $Y_2O_3$ of 99.99% and $Tb_4O_7$ of 99.99% are taken as main raw materials. 10.58 g $Na_2CO_3$, 5.64 g $Y_2O_3$, 10.88 g $SiO_2$ and 2.33 g $Tb_4O_7$ are mixed together and the obtained mixture is fired at 1350° C. for 2 hours. Then the frit is poured out, cooled to the room temperature and further annealed in reducing atmosphere at 900° C. for 4 hours, wherein the volume ration of nitrogen and hydrogen in the reducing atmosphere is 95:5. After that, the green light-emitting glass $32Na_2O.8Y_2O_3.58SiO_2.2Tb_2O_3$ is obtained.

Example 5

Analytically pure $K_2CO_3$, analytically pure $SiO_2$ as well as $Y_2O_3$ of 99.99% and $Tb_4O_7$ of 99.99% are taken as main raw materials. 13.76 g $K_2CO_3$, 5.62 g $Y_2O_3$, 8.97 g $SiO_2$ and 1.03 g $Tb_4O_7$ are mixed together and the obtained mixture is fired at 1400° C. for 2 hours. Then the frit is poured out, cooled to the room temperature and further annealed in reducing atmosphere at 1100° C. for 2 hours, wherein the volume ration of nitrogen and hydrogen in the reducing atmosphere is 95:5. After that, the green light-emitting glass $36K_2O.9Y_2O_3.54SiO_2.1Tb_2O_3$ is obtained.

Example 6

Analytically pure $Li_2CO_3$, analytically pure $SiO_2$ as well as $Y_2O_3$ of 99.99% and $Tb_4O_7$ of 99.99% are taken as main raw materials. 10.99 g $Li_2CO_3$, 4.03 g $Y_2O_3$, 14.33 g $SiO_2$ and 2.22 g $Tb_4O_7$ are mixed together and the obtained mixture is fired at 1250° C. for 2 hours. Then the fit is poured out, cooled to the room temperature and further annealed in reducing atmosphere at 600° C. for 20 hours, wherein the volume ration of nitrogen and hydrogen in the reducing atmosphere is 95:5. After that, the green light-emitting glass $36.2Li_2O.4.35Y_2O_3.58SiO_2.1.45Tb_2O_3$ is obtained.

Example 7

Analytically pure $Na_2CO_3$, analytically pure $SiO_2$ as well as $Y_2O_3$ of 99.99% and $Tb_4O_7$ of 99.99% are taken as main raw materials. 10.63 g $Na_2CO_3$, 3.02 g $Y_2O_3$, 12.08 g $SiO_2$ and 3.75 g $Tb_4O_7$ are mixed together and the obtained mixture is fired at 1350° C. for 2 hours. Then the frit is poured out, cooled to the room temperature and further annealed in reducing atmosphere at 900° C. for 4 hours, wherein the volume ration of nitrogen and hydrogen in the reducing atmosphere is 95:5. After that, the green light-emitting glass $30.9Na_2O.4.12Y_2O_3.61.89SiO_2.3.09Tb_2O_3$ is obtained.

Example 8

Analytically pure $Na_2CO_3$, analytically pure $SiO_2$ as well as $Y_2O_3$ of 99.99% and $Tb_4O_7$ of 99.99% are taken as main raw materials. 11.85 g $Na_2CO_3$, 2.39 g $Y_2O_3$, 14.32 g $SiO_2$ and 1.37 g $Tb_4O_7$ are mixed together and the obtained mixture is fired at 1350° C. for 2 hours. Then the frit is poured out, cooled to the room temperature and further annealed in reducing atmosphere at 900° C. for 4 hours, wherein the volume ration of nitrogen and hydrogen in the reducing atmosphere is 95:5. After that, the green light-emitting glass $30.68Na_2O.2.91Y_2O_3.65.4SiO_2.1.01Tb_2O_3$ is obtained.

Example 9

Analytically pure $Na_2CO_3$, analytically pure $Li_2CO_3$, analytically pure $SiO_2$ as well as $Y_2O_3$ of 99.99% and $Tb_4O_7$ of 99.99% are taken as main raw materials. 5.62 g $Na_2CO_3$, 3.91 g $Li_2CO_3$, 4.79 g $Y_2O_3$, 12.74 g $SiO_2$ and 2.64 g $Tb_4O_7$ are mixed together and the obtained mixture is fired at 1350° C. for 2 hours. Then the frit is poured out, cooled to the room temperature and further annealed in reducing atmosphere at 800° C. for 6 hours, wherein the volume ration of nitrogen and hydrogen in the reducing atmosphere is 95:5. After that, the green light-emitting glass $15.3Na_2O.15.3Li_2O.6.12Y_2O_3.61.2SiO_2.2.04Tb_2O_3$ is obtained.

Example 10

Analytically pure $Na_2CO_3$, analytically pure $Li_2CO_3$, analytically pure $SiO_2$ as well as $Y_2O_3$ of 99.99% and $Tb_4O_7$ of 99.99% are taken as main raw materials. 7.19 g $Na_2CO_3$, 5.01 g $Li_2CO_3$, 3.68 g $Y_2O_3$, 13.08 g $SiO_2$ and 2.03 g $Tb_4O_7$ are mixed together and the obtained mixture is fired at 1350° C. for 2 hours. Then the fit is poured out, cooled to the room temperature and further annealed in reducing atmosphere at 800° C. for 6 hours, wherein the volume ration of nitrogen and hydrogen in the reducing atmosphere is 95:5. After that, the green light-emitting glass $18.1Na_2O.18.1Li_2O.4.35Y_2O_3.58SiO_2.1.45Tb_2O_3$ is obtained.

Example 11

Analytically pure $Li_2CO_3$, analytically pure $SiO_2$ as well as $Y_2O_3$ of 99.99% and $Tb_4O_7$ of 99.99% are taken as main raw materials. 9.4 g $Li_2CO_3$, 0.005 g $Y_2O_3$, 9.55 g $SiO_2$ and 11.88 g $Tb_4O_7$ are mixed together and the obtained mixture is fired at 1250° C. for 5 hours. Then the frit is poured out, cooled to the room temperature and further annealed in reducing atmosphere at 650° C. for 5 hours, wherein the volume ration of nitrogen and hydrogen in the reducing atmosphere is 95:5. After that, the green light-emitting glass $40Li_2O.0.01Y_2O_3.50SiO_2.9.99Tb_2O_3$ is obtained.

Example 12

Analytically pure $K_2CO_3$, analytically pure $SiO_2$ as well as $Y_2O_3$ of 99.99% and $Tb_4O_7$ of 99.99% are taken as main raw materials. 15.29 g $K_2CO_3$, 6.24 g $Y_2O_3$, 8.31 g $SiO_2$ and 0.01 g $Tb_4O_7$ are mixed together and the obtained mixture is fired at 1500° C. for 1 hours. Then the fit is poured out, cooled to the room temperature and further annealed in reducing atmosphere at 700° C. for 15 hours, wherein the volume ration of nitrogen and hydrogen in the reducing atmosphere is 95:5. After that, the green light-emitting glass $40K_2O.10Y_2O_3.50SiO_2.0.01Tb_2O_3$ is obtained.

Example 13

Analytically pure $Na_2CO_3$, analytically pure $K_2CO_3$, analytically pure $SiO_2$ as well as $Y_2O_3$ of 99.99% and $Tb_4O_7$ of 99.99% are taken as main raw materials. 4.66 g $Na_2CO_3$, 6.55 g $K_2CO_3$, 2.11 g $Y_2O_3$, 6.96 g $SiO_2$ and 8.9 g $Tb_4O_7$ are mixed together and the obtained mixture is fired at 1300° C. for 3 hours. Then the frit is poured out, cooled to the room temperature and further annealed in reducing atmosphere at 850° C. for 10 hours, wherein the volume ration of nitrogen and hydrogen in the reducing atmosphere is 95:5. After that, the green light-emitting glass $18.3Na_2O.19.7Li_2O.3.9Y_2O_3.48.2SiO_2.9.9Tb_2O_3$ is obtained.

Example 14

Analytically pure $Na_2CO_3$, analytically pure $K_2CO_3$, analytically pure $Li_2CO_3$, analytically pure $SiO_2$ as well as $Y_2O_3$ of 99.99% and $Tb_4O_7$ of 99.99% are taken as main materials. 3.94 g $Na_2CO_3$, 4.8 g $K_2CO_3$ 3.27 g $Li_2CO_3$, 6.75 g $Y_2O_3$, 9.2 g $SiO_2$ and 2.16 g $Tb_4O_7$ are mixed together and the obtained mixture is fired at 1300° C. for 3 hours. Then the frit is poured out, cooled to the room temperature and further annealed in reducing atmosphere at 1050° C. for 2.5 hours, wherein the volume ration of nitrogen and hydrogen in the reducing atmosphere is 95:5. After that, the green light-emitting glass $12.2Na_2O.11.4K_2O.14.5Li_2O.9.8Y_2O_3.50.2SiO_2.1.9Tb_2O_3$ is obtained.

Example 15

Analytically pure $Na_2CO_3$, analytically pure $K_2CO_3$, analytically pure $Li_2CO_3$, analytically pure $SiO_2$ as well as $Y_2O_3$ of 99.99% and $Tb_4O_7$ of 99.99% are taken as main materials. 3.33 g $Na_2CO_3$, 4.34 g $K_2CO_3$ 1.16 g $Li_2CO_3$, 6.75 g $Y_2O_3$, 12.28 g $SiO_2$ and 0.58 g $Tb_4O_7$ are mixed together and the obtained mixture is fired at 1300° C. for 3 hours. Then the fit is poured out, cooled to the room temperature and further annealed in reducing atmosphere at 1050° C. for 2.5 hours, wherein the volume ration of nitrogen and hydrogen in the reducing atmosphere is 95:5. After that, the green light-emitting glass $10Na_2O.10K_2O.5Li_2O.9.5Y_2O_3.65SiO_2.0.5Tb_2O_3$ is obtained.

The invention claimed is:

1. A green light-emitting glass, wherein components with parts by mole of which are alkali oxide 25~40, $Y_2O_3$ 0.01~15, $SiO_2$ 40~70 and $Tb_2O_3$ 0.01~15, the alkali oxide is at least one selected from a group of $Na_2O$ and $K_2O$.

2. The green light-emitting glass according to claim 1, wherein the components with parts by mole of the green light-emitting glass are alkali oxide 30~38, $Y_2O_3$ 1~10, $SiO_2$ 50~65 and $Tb_2O_3$ 1~10.

3. A method of preparing the green light-emitting glass, wherein the method including mixing raw material of alkali salt, $Y_2O_3$, $SiO_2$ and $Tb_4O_7$, firing the raw material at 1200° C.~1500° C. for 1~5 hours, cooling the raw material to a room temperature, annealing the raw material in a reducing atmosphere at 600° C.~1200° C. for 1~20 hours and then obtaining the green light-emitting glass, components with parts by mole of which are alkali oxide 25~40, $Y_2O_3$ 0.01~15, $SiO_2$ 40~70 and $Tb_2O_3$ 0.01~15, the alkali oxide is at least one selected from a group of $Na_2O$ and $K_2O$.

4. The method of preparing the green light-emitting glass according to claim 3, wherein the method includes taking the alkali salt, $Y_2O_3$, $SiO_2$ and $Tb_4O_7$ as the raw material, mixing the raw material uniformly and placing the raw material in a crucible for firing at 1300° C.-1450° C. for 1-5 hours; pouring out produced frit, cooling the produced frit to the room temperature, annealing the produced frit in a gas mixture of nitrogen and hydrogen at 650° C.-900° C. for 2-15 hours and then obtaining the green light-emitting glass, wherein a volume ratio of the nitrogen and hydrogen is 95:5; parts by mole of alkali metal element in the raw material are 50-80, parts by mole of Y element in the raw material are 0.02-30, parts by mole of Si element in the raw material are 40-70, and parts by mole of Tb element in the raw material are 0.02-30.

5. The method of preparing the green light-emitting glass according to claim 4, wherein, the parts by mole of alkali metal element in the raw material are preferably 60-76, parts by mole of Y element in the raw material are preferably 2-20, parts by mole of Si element in the raw material are preferably 50-65, and parts by mole of Tb element in the raw material are preferably 2-20.

6. The method of preparing the green light-emitting glass according to claim 5, wherein purities of the alkali salt, $Y_2O_3$, $SiO_2$ and $Tb_4O_7$ are no less than that of an analytical reagent.

7. The method of preparing the green light-emitting glass according to claim 5, wherein the alkali salt is at least one selected from a group of sodium salt, and potassium salt.

8. The method of preparing the green light-emitting glass according to claim 7, wherein the alkali salt is at least one selected from a group of sodium carbonate, and potassium carbonate.

9. The method of preparing the green light-emitting glass according to claim 4, wherein purities of the alkali salt, $Y_2O_3$, $SiO_2$ and $Tb_4O_7$ are no less than that of an analytical reagent.

10. The method of preparing the green light-emitting glass according to claim 4, wherein the alkali salt is at least one selected from a group of sodium salt, and potassium salt.

11. The method of preparing the green light-emitting glass according to claim 10, wherein the alkali salt is at least one selected from a group of sodium carbonate, and potassium carbonate.

12. The method of preparing the green light-emitting glass according to claim 3, wherein purities of the alkali salt, $Y_2O_3$, $SiO_2$ and $Tb_4O_7$ are no less than that of an analytical reagent.

13. The method of preparing the green light-emitting glass according to claim 3, wherein the alkali salt is at least one selected from a group of sodium salt, and potassium salt.

14. The method of preparing the green light-emitting glass according to claim 13, wherein the alkali salt is at least one selected from a group of sodium carbonate, and potassium carbonate.

* * * * *